US005942723A

United States Patent [19]

Laricchia

[11] Patent Number: 5,942,723

[45] Date of Patent: Aug. 24, 1999

[54] POSITIVE LOCKING MECHANISM FOR IN-LINE SWITCH

[75] Inventor: Rocco Valentino Laricchia, Pickering, Canada

[73] Assignee: The Whitaker Corporation, Wilmington, Del.

[21] Appl. No.: 08/836,763

[22] PCT Filed: Oct. 13, 1995

[86] PCT No.: PCT/US95/12946

§ 371 Date: May 5, 1997

§ 102(e) Date: May 5, 1997

[87] PCT Pub. No.: WO96/14649

PCT Pub. Date: May 17, 1996

[30] Foreign Application Priority Data

Nov. 7, 1994 [CA] Canada .................................. 2135263

[51] Int. Cl.$^{6}$ ...................................................... H02G 7/20

[52] U.S. Cl. ................................................ 174/44; 200/49

[58] Field of Search ................................ 174/44, 138 R, 174/137 R, 43, 146, 147, 160, 208, 169, 177; 200/48 KB, 48 SB, 49

[56] References Cited

U.S. PATENT DOCUMENTS

| | | | |
|---|---|---|---|
| 2,147,141 | 2/1939 | Blancha | 464/115 |
| 2,953,655 | 9/1960 | Warner, Jr. et al. | 200/485 B |
| 3,248,510 | 4/1966 | McCloud | 200/555 |
| 3,361,880 | 1/1968 | Symes | 200/48 KB |
| 4,014,504 | 3/1977 | Sachs | 248/61 |
| 5,789,700 | 8/1998 | Young et al. | 174/40 CC |

*Primary Examiner*—Kristine Kincaid
*Assistant Examiner*—Dhiru R. Patel
*Attorney, Agent, or Firm*—Mary K. VanAtten

[57] ABSTRACT

An isolating switch for an electric power line including a sub-assembly made up of two electrically conductive and pieces interconnected by at least one insulator. The end pieces have respective aligned grooves for registry with the electric power line, and securing members for permanently securing the end pieces to the electric power line. The sub-assembly is provided with two keeper bars for mounting the sub-assembly to the power line prior to permanently securing the end pieces to the power line. Each of the keeper bars is pivotally mounted on a respective one of the end pieces and is pivotable manually between a first position in which the keeper bar is completely clear of the groove and a second position in which the keeper bar extends across the groove to retain the sub-assembly on the power line. A detent member is provided on each end piece for cooperation with the respective keeper bar, and a spring member urges the keeper bar and detent member into mutual engagement when the keeper bar is in the second position to retain the keeper bar in the second position.

10 Claims, 4 Drawing Sheets

POSITIVE LOCKING MECHANISM FOR IN-LINE SWITCH

FIELD OF THE INVENTION

This invention relates to overhead power line isolators.

BACKGROUND OF THE INVENTION

Canadian patent application Serial No. 2,092,741 filed on Mar. 26, 1993 discloses an isolating switch for an overhead power line, which isolating switch has main sub-assembly formed of two parallel spaced insulators joined at their ends by aluminum end pieces. The end pieces each have a slot aligned with the space between the two insulators such that the sub-assembly may be hung on a hot power line with the line passing along the slots and the space between the insulators. An integral rod projecting from each end piece in alignment with but below the slot may then be clamped to the line by wedges and C-shaped clamps after which the line may be severed at a location between the end pieces to isolate the line.

To retain the sub-assembly on the line prior to attachment of the rods to the line a keeper bar is provided on each end piece. The keeper bars are pivotally mounted on one side of the slot and may be swung across the slot when the sub-assembly is in place on the line to engage respectively two studs on the other side of the slot. Nuts may then be applied to the studs to secure the keeper bars in place which in turn retain the sub-assembly on the line.

It is a feature of the present invention to provide an improved mounting mechanism.

SUMMARY OF THE INVENTION

Accordingly the present invention provides in a broad form an isolating switch for an electric power line comprising a sub-assembly made up of two electrically conductive end pieces interconnected by at least one insulator, the end pieces having respective aligned grooves for registry with the electric power line, and means for permanently securing the end pieces to the electric power line, the sub-assembly being provided with means for mounting the sub-assembly to the power line prior to permanently securing the end pieces to the power line, wherein the means for mounting comprises two keeper bars, each being pivotally mounted on a respective one of the end pieces and being pivotable manually between a first position in which the keeper bar is completely clear of the groove and a second position in which the keeper bar extends across the groove to retain the sub-assembly on the power line, detent means being provided on each end piece for cooperation with the respective keeper bar, and spring means urging the keeper bar and detent means into mutual engagement when the keeper bar is in the second position to retain the keeper bar in the second position.

More particularly, in a preferred embodiment the detent means comprises aligned detent grooves formed on a pair of raised bosses, one on either side of the groove which receives the line. When the keeper bar is in the second position it is received snugly in the aligned detent grooves and when the keeper bar is in the first position it is received in only one of the grooves and extends 180° from the second position.

Although the invention is particularly applicable to the power line isolator of Canadian patent application Serial No. 2,092,741, it should be apparent that the invention can also be used with other types of power line isolators in which a portion of the isolator is hung on the power line prior to attachment of the ends of the isolator to the power line.

An isolating switch for an electric power line comprising a sub-assembly made up of two electrically conductive end pieces interconnected by at least one insulator, the end pieces having respective aligned grooves for registry with the electric power line, and securing members for permanently securing the end pieces to the power line, the sub-assembly being provided with two keeper bars for mounting the sub-assembly to the power line prior to permanently securing the end pieces to the power line, each of the keeper bars being pivotally mounted on a respective one of the end pieces and being pivotable manually between a first position in which the keeper bar is completely clear of the groove and a second position in which the keeper bar extends across the groove to retain the sub-assembly on the power line, a detent member being provided on each end piece for cooperation with the respective keeper bar, and a spring member urging the keeper bar and detent member into mutual engagement when the keeper bar is in the second position to retain the keeper bar in the second position.

BRIEF DESCRIPTION OF THE DRAWINGS

The invention will now be described in greater detail with reference to the accompanying drawings, in which.

DETAILED DESCRIPTION OF AN EMBODIMENT OF THE INVENTION

Figures 1, 2:
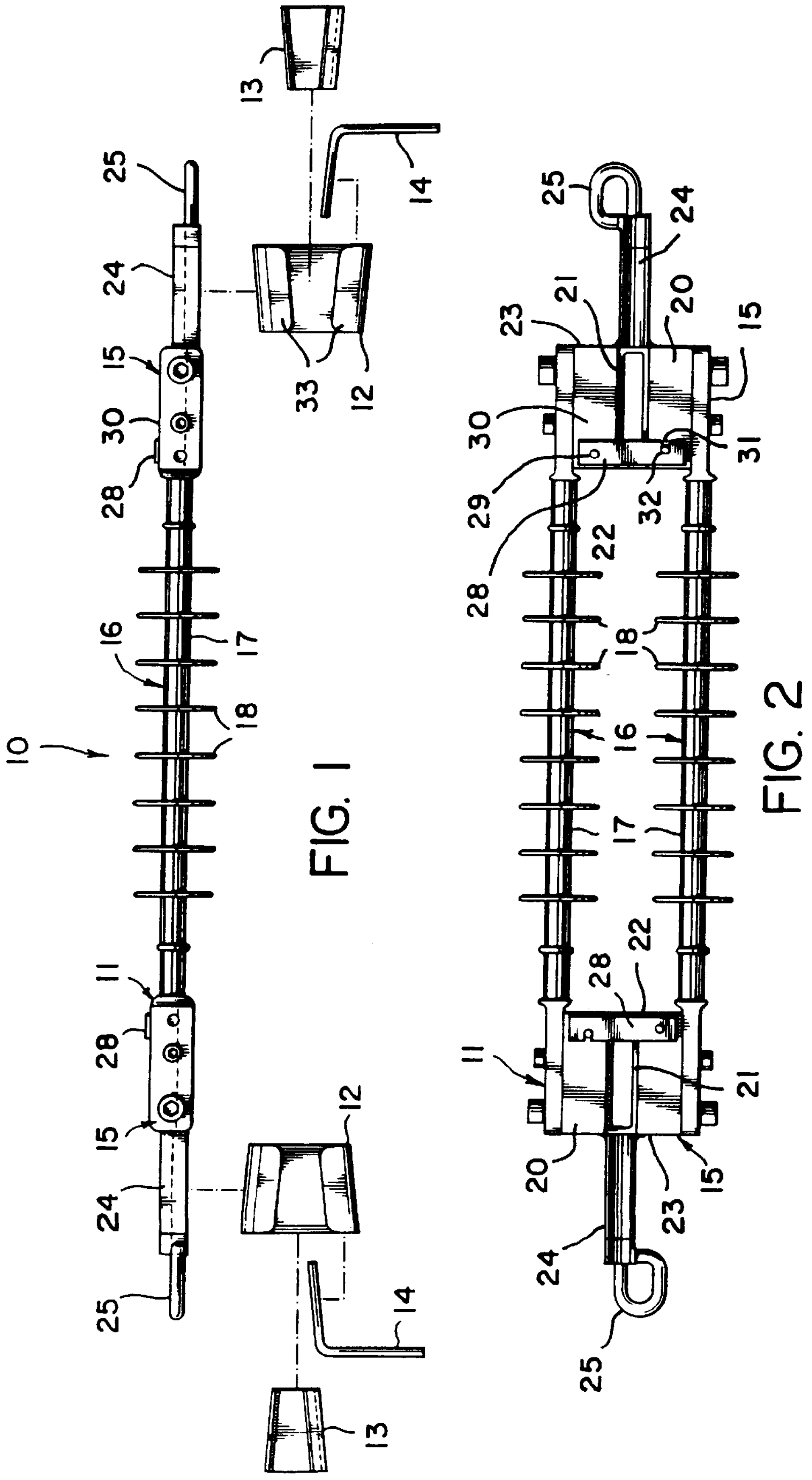
FIG. 1 is a side elevational, partly exploded view of an isolating switch according to Canadian patent application Serial No. 2,092,741.
FIG. 2 is a top view of the main sub-assembly of the isolating switch of FIG. 1.

Referring firstly to FIGS. 1 and 2, an isolating switch 10 comprises a main sub-assembly 11, two C-shaped members 12, two wedges 13 and two jumper studs 14.

The sub-assembly 11 is formed by two aluminum end pieces 15 spaced apart by two identical parallel spaced insulators 16 each of which typically is formed of a fibreglass rod 17 having a rubberized exterior and a series of spaced integral discs 18 which are also rubberized. Porcelain can also be used for the insulators 16. The insulators 16 are securely connected to the end pieces 15 by any suitable means such as crimping.

Each end piece 15 has a generally rectangular portion 20 having a through slot 21 extending between an inner end 22 and an outer end 23 of rectangular portion 20. The two slots 21 are mutually aligned with an axis extending parallel to and midway between the rods 17. Each end piece also includes a rod 24 which is secured to the rectangular portion 20 for example by means of a weld and extends from the outer end in alignment with the axis of the slot 21 as seen in FIG. 2 but slightly below the level of the slot 21 as seen in FIG. 1. The rod 24 may have at its free end an eye 25 for engagement by a hot stick or hoist.

Each end piece 15 is completed by a keeper bar 28 which is pivotally mounted on a pin 29 extending from the upper face 30 as seen in FIG. 2 of rectangular portion 20. The keeper bar 28 may be swung across the slot such that a notch 31 provided in the bar at a location remote from pin 29 engages a stud 32 also extending from upper face 30. A nut (not shown) may be used to engage the stud 32 and secure the keeper bar in the position shown in FIG. 2.

The two C-shaped members 12 and wedges 13 are also made of aluminum and are well known for interconnecting two conductors. The C-shaped members 12 each have two spaced curved channels 33. The isolating assembly is completed by the two jumper studs 14 which are formed as angled aluminum or tin plated copper rods.

Figures 3, 4:
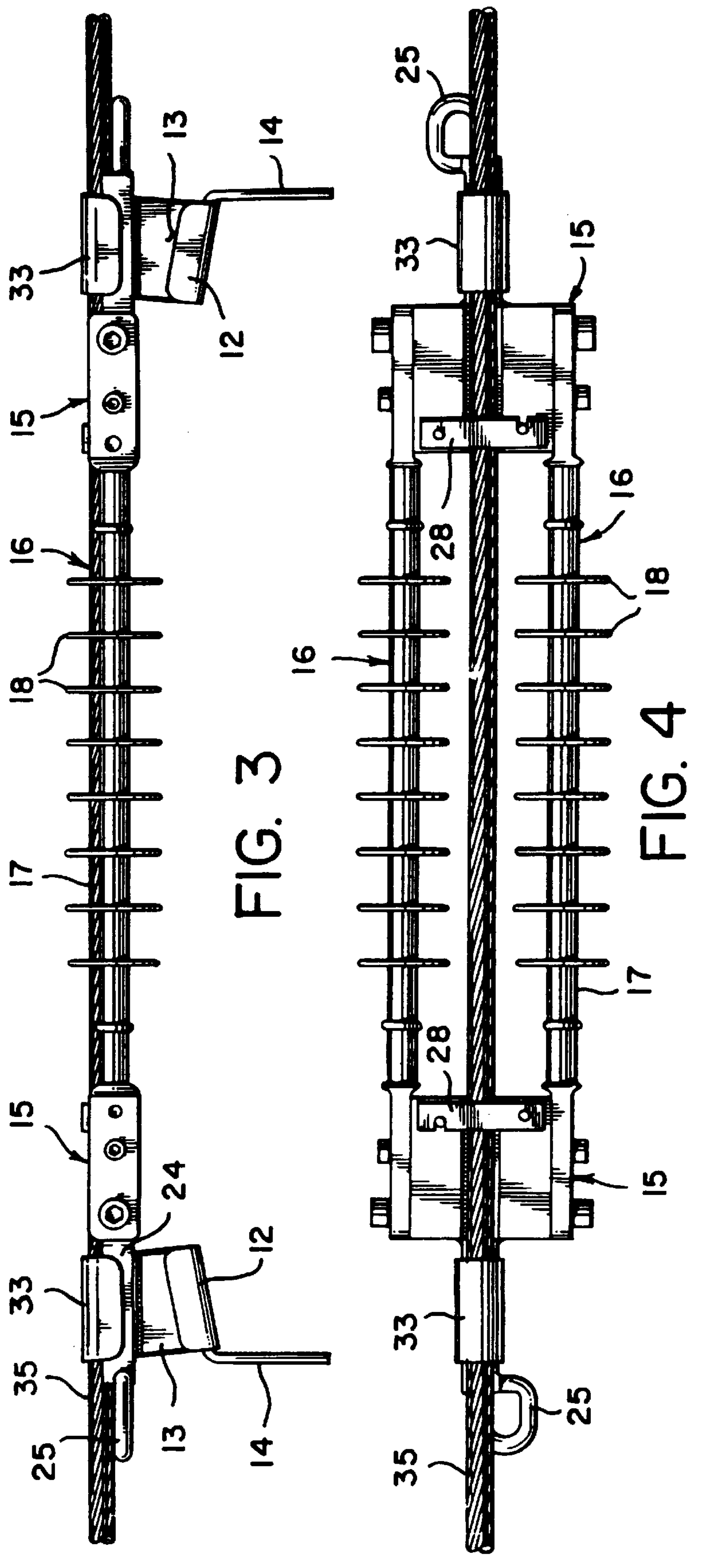
FIG. 3 is a side elevational view of the isolating switch of FIGS. 1 and 2 shown clamped on a power line.
FIG. 4 is a top view of the isolating switch shown clamped on a power line.

Referring now to FIGS. 3 and 4, these show the isolating switch 10 clamped to a power line 35. To apply the isolating assembly to the power line the main component 11 is hung on the power line by aligning the power line 35 along the slots 21 and swinging the keeper bars 28 across the respective slots 21 and securing them to the studs 32 by means of the nuts (not shown). This step might best be accomplished by firstly laying the sub-assembly 11 on top of the line 35, then securing the keeper bars 28 and finally rotating the sub-assembly 11 about line 35 such that the keeper bars 28 lie on top of the line 35 as shown in FIGS. 3 and 4. Other installation practices may be used.

With the sub-assembly 11 hung on the power line 35 the C-shaped members 12 can then be hung over the power line 35 in registry respectively with the rods 24 of the end pieces 15. Thus, a curved channel 33 of each C-shaped member 12 encompasses one of the rods 24 and a portion of power line 35. The jumper studs 14 are then positioned respectively in the other curved channels of the C-shaped members and the wedges 13 are forced into the C-shaped members by means of a powder actuated tool in a manner known to clamp the power line 35 securely to the rods 24 and to clamp the jumper studs 14 to the C-shaped members.

Rod 24 is preferably contoured on its upper surface in a fashion complementary to that of the curved channel 33 so as to define a generally circular section space for reception of power line 35.

Once the isolating switch 10 and power line 35 have been clamped together the power line can be cut by wire snippers at a point lying between the two insulators 16, preferably substantially equidistantly from the end pieces 15. It is noted that when the power line 35 is cut there is no recoil of the line or movement of the clamps 12, 13. Then, the two cut ends are forced upwardly and away from each other to isolate the power line 35 or the section between the ends can be cut out completely.

A jumper cable (not shown) may be connected across jumper studs 14 as described to re-energise the line. Alternatively, as more completely described in above-mentioned Canadian patent application Serial No. 2,092,741, the isolating switch may be formed with a blade switch disposed below and parallel to the insulator 16 and connected across the end pieces. Manual operation of the blade switch can be effected selectively to energise or re-energise the line.

The present invention is particularly concerned with improving the mechanism for securing the sub-assembly 11 to the line 35 prior to application of the C-shaped members 12 and complementary wedges 13. As shown in FIGS. 1 to 4 the previously disclosed mechanism comprises keeper bar 28, pin 29 and stud 30.

Reference should now be made to FIGS. 5 through 9 for an understanding of the improved mounting mechanism of the invention.

Figure 5:
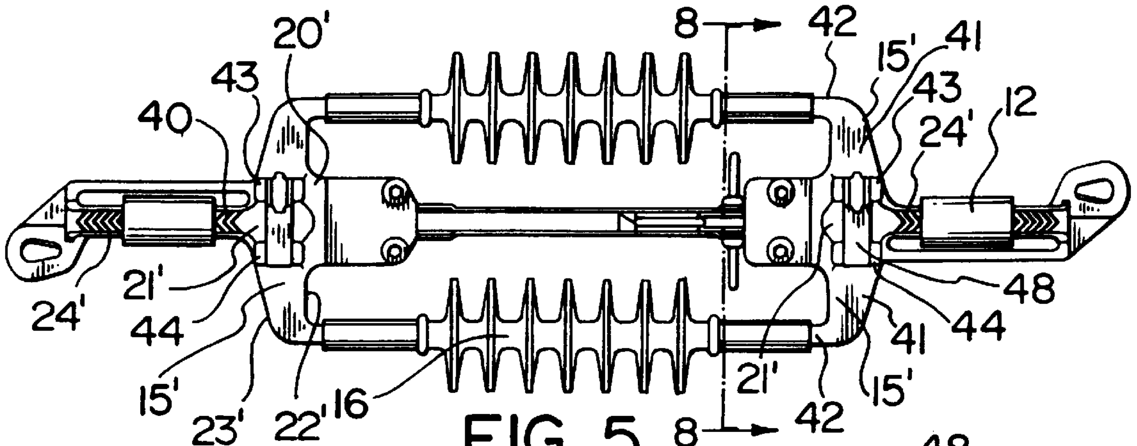
FIG. 5 is a top view of the main sub-assembly of an isolating switch incorporating a mounting mechanism according to the present invention.
Figure 6:
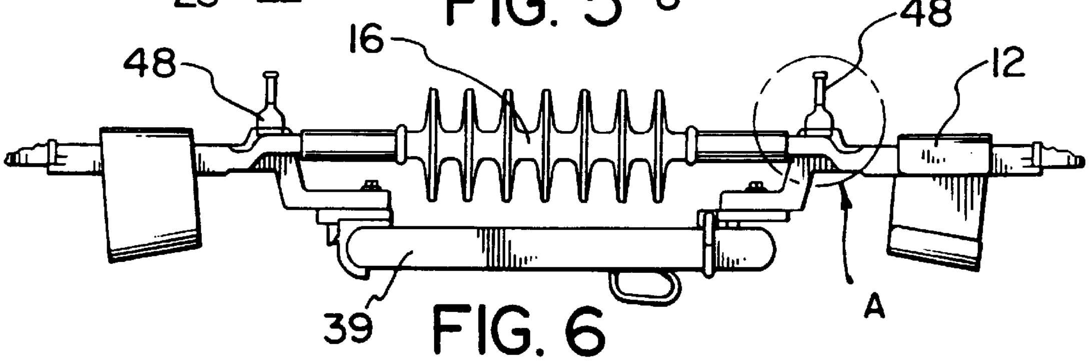
FIG. 6 is a side view of the main sub-assembly shown in FIG. 5.

The switch of FIGS. 5 and 6 is similar to that illustrated in FIGS. 1 to 4 except as follows. Firstly, a blade switch 39 is disposed below and parallel to the insulators 16 but as indicated above, this was disclosed in Canadian patent application Serial No. 2,092,741 and has no bearing on the present invention.

Secondly, FIGS. 1 to 4 illustrate the switch in prototype form with simplified end pieces 15 formed with rectangular portions 20 to which the rods 24 are welded while FIGS. 5 and 6 illustrate production quality end pieces 15' each of which is cast as a one piece yoke plate along with rod 241.

In this format of end piece, instead of a through slot 21, the yoke plate 15' is formed with a groove 21' extending between inner and outer ends 22' and 23' of a generally rectangular portion 20' and an alignment with a similar groove 21' extending along rod 24'.

Figure 8:
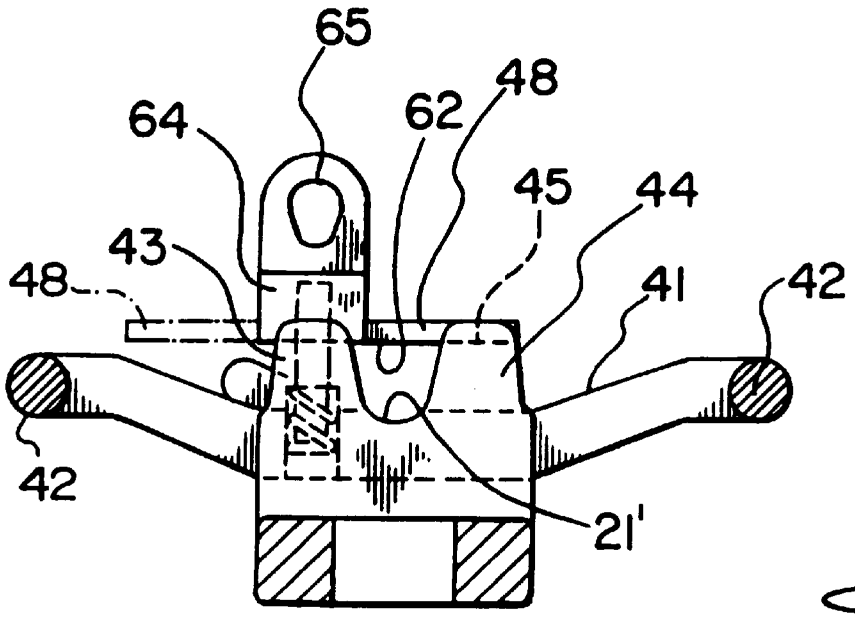
FIG. 8 is an view taken on line 8—8 of FIG. 5.

Two wing portions 41 are integrally formed with the rectangular portion 20' and these terminate in spaced arms 42 which extend parallel to groove 21' but are raised with respect to the plane of rectangular portion 20' as seen in FIGS. 6 and 8. The insulators 16 are securely connected to arms 42 by any suitable means such as crimping.

Where the wing portions 41 join the rectangular portion 20' two raised generally rectangular bosses 43 and 44 are integrally formed on the rectangular portion, one on either side of the groove 21'. These bosses form part of the mechanism for temporarily mounting the switch sub-assembly 11 on the line 35 according to the invention. More particularly, each boss is provided on its upper surface with a groove 45 having flat parallel sides and a flat bottom as shown most clearly in FIG. 7. The grooves 45 of the two bosses are aligned with each other transversely with respect to the groove 21' which receives the line 35, and each groove 45 extends the entire width of the boss 43 or 44.

Figure 7:
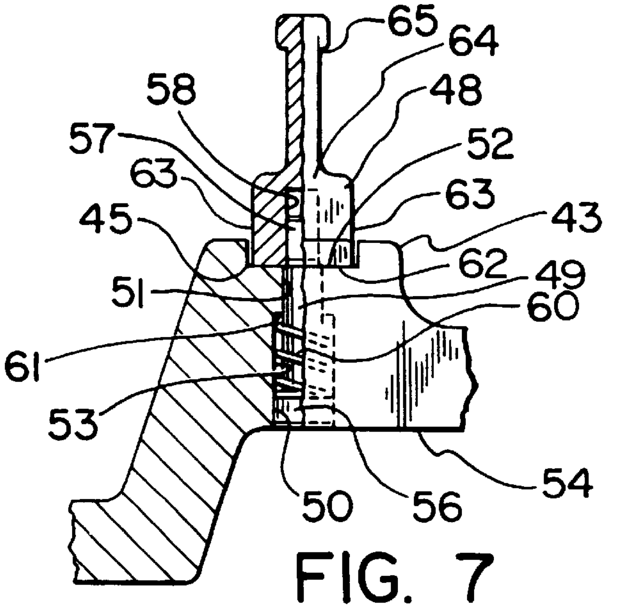
FIG. 7 is an enlarged view showing details of the circled portion a of FIG. 6.

A keeper bar 48 is pivotally mounted to the boss 43 by means of a bolt 49. More particularly, as shown in FIG. 7, an aperture 50 extends entirely through the thickness of the rectangular portion 20' and the boss 43, a relatively narrow portion 51 of aperture 50 opening centrally onto the bottom 52 of the groove 45 of boss 43 and a relatively wide portion 53 opening onto the underside 54 of rectangular portion 20'.

The bolt 49 is received in the aperture 50 such that the head 56 of the bolt is received in the portion 53 of aperture 50 and an upper threaded end 57 of the bolt projects upwardly out of the portion 51 of aperture 50 where it is threadably received in a tapped hole 58 provided in the underside 59 of keeper bar 48 proximate one end of the keeper bar.

The head 56 has a shape and diameter conforming to the diameter of the wide portion 53 of aperture 50 thereby enabling sliding movement of the head relative to the aperture. A coil spring 60 is positioned on the shank of the bolt 49 with one end in engagement with the shoulder 61 formed between the portions 51 and 53 of aperture 50. The dimensions of spring 60, aperture 50 and bolt 49 are such that the keeper bar 48 is normally urged by the spring 60 to seat firmly in the groove 45 of boss 43.

The keeper bar 48 has a flat bottom 62 and parallel flat sides 63 spaced apart slightly less than the width of groove 45 and over most of the bar length there extends a flat top. However, the bar 48 has a thicker portion 64 proximate one end and an eye 64 is formed on the thicker portion 64.

Figure 9:
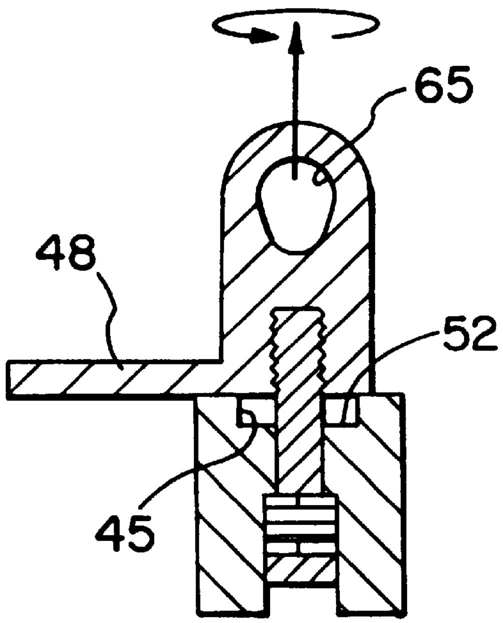
FIG. 9 is a schematic view illustrating how the keeper bar is moved between the open and closed position.

Before the sub-assembly 11 is laid on the line 35, the operator ensures the keeper bar of each yoke plate 15' is in the dotted position shown in FIG. 8. This is the open position because in this position the keeper bar does not bridge the two bosses 43 and 44 but extends 180° away from boss 44. If the keeper bar is in the closed position illustrated by full lines in FIG. 8, the operator simply pulls the keeper bar up and out of the groove 45 against the action of spring 60 and when the bottom 62 of the keeper bar is clear of the groove 45, the operator rotates the keeper bar 180° until it aligns once more with the groove 45 but this time in the open position where it snaps into place. This action is illustrated in FIG. 9.

The sub-assembly 11 is then raised on to the line 35 using hot sticks engaging the eyes 65. In this way, the sub-assembly is laid on the line 35 with the bosses 43 and 44 extending downwardly toward the ground. In this position, both keeper bars 48 an then be rotated 180° to the closed position by manipulating the hot sticks in a pulling and twisting action as described above in connection with the opening of the keeper bars.

As each keeper bar rotates it slides over the boss 43 and then snaps into the groove 45 of boss 43 as well as the aligned groove 45 of boss 44. With the keeper bars 48 now in the closed position the sub-assembly 11 can be rotated so that it hangs below the line 35 by virtue of engagement of the keeper bars with the line. The strong spring bias and positive engagement between the keeper bars and the aligned grooves ensures that the keeper bars remain in the closed position.

Particularly if the switch were not being installed by hot stick, it would not be necessary to rotate the keeper bars to the complete 180° open position. Providing the keeper bars were rotated sufficiently away from the opposite boss 44 to open up the line groove 40, the sub-assembly 11 could be applied to the line and the keeper bars closed as before. Thus, an open position could be established where the keeper bar has been removed from its groove 45 and rotated to a 90° position in which it lies along the upper surface of the boss 43 at right angles to its groove 45. The spring bias produced by coil spring 60 would be sufficient to hold the keeper bar open against the boss 43 until the sub-assembly 11 had been laid on the line 35 at which time the keeper bars could then be rotated to the closed position.

Figure 10:
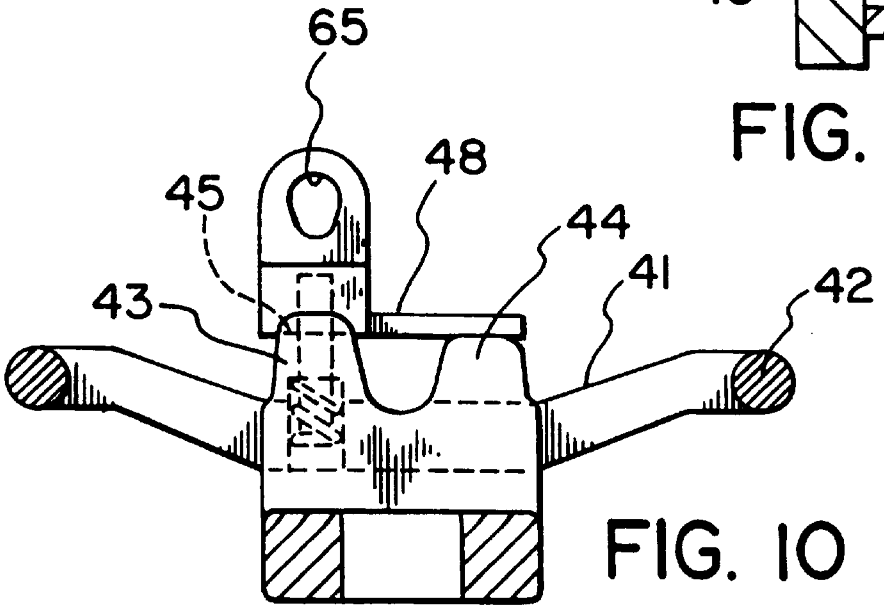
FIG. 10 a view similar to FIG. 8 but illustrating a slightly modified embodiment.

In the embodiment shown in FIG. 10, the boss 44 does not have a groove 45. Instead, boss 44 is lowered by an amount equal to the depth of groove 45. Thus, in the closed position the keeper bar 48 is received in groove 45 and extends across the space between the two bosses with its free end in engagement with the upper surface of boss 44. Although this is not the preferred embodiment it is believed that the keeper bars of this embodiment would operate satisfactorily to retain the sub-assembly on the line 35.

It should be noted that the coil spring 60 is only one example of a spring which will provide the necessary biasing action. As another example, a type of spring which is similar to an undulating washer and is known as a wave spring could be used.

I claim:

1. An isolating switch for an electric power line comprising a sub-assembly made up of two electrically conductive end pieces interconnected by at least one insulator, the end pieces having respective aligned grooves for registry with the electric power line, and securing members for permanently securing the end pieces to the electric power line, the sub-assembly being provided with two keeper bars for mounting the sub-assembly to the power line prior to permanently securing the end pieces to the power line, each of the keeper bars being pivotally mounted on a respective one of the end pieces and being pivotable manually between a first position in which the keeper bar is completely clear of the groove and a second position in which the keeper bar extends across the groove to retain the sub-assembly on the power line, a detent member being provided on each of said end pieces cooperation with the respective keeper bar, and a spring member urging the keeper bar and detent member into mutual engagement when the keeper bar is in the second position to retain the keeper bar in the second position.

2. An isolating switch of claim 1, in wherein the spring member comprises a coil spring mounted on a pivot member upon which the keeper bar is pivotally mounted, the coil spring biasing the keeper bar towards the respective end piece.

3. An isolating switch of claim 1, wherein the spring member comprises a wave spring mounted on a pivot member upon which the keeper bar is pivotally mounted, the wave spring biasing the keeper bar towards the respective end piece.

4. An isolating switch of claim 1 wherein the detent member is a detent groove provided in the end piece and extending generally transversely of the groove which receives the power line, the detent groove being dimensioned to receive the keeper bar snugly therein when the keeper bar is in the second position.

5. An isolating switch of claim 4, wherein the keeper bar is pivotally mounted about an end thereof and the detent groove is dimensioned to receive the keeper bar snugly therein when the keeper bar is in the first position, the first and second positions being 180° apart.

6. An isolating switch of claim 5, wherein the detent groove is located on a first boss provided on the end piece on one side of the groove which receives the power line, a second boss being provided on the other side of the groove and in alignment with the first boss for engagement with the keeper bar when in the second position.

7. An isolating switch of claim 6, wherein the second boss has a detent groove aligned with the detent groove on the first boss for reception of the keeper bar when in the second position.

8. An isolating switch of claim 7, wherein each said detent groove has parallel flat sides and a flat bottom which engage complementary surfaces of the keeper bar.

9. An isolating switch according to claim 1, wherein the keeper bar is provided with an eye for engagement by a hot stick.

10. An isolating switch of claim 4, wherein each said detent groove has parallel flat sides and a flat bottom which engage complementary surfaces of the keeper bar.

* * * * *